(12) United States Patent
Glavier

(10) Patent No.: US 12,534,226 B2
(45) Date of Patent: Jan. 27, 2026

(54) SEPARATION DEVICE WITH DAMPED LASHING STUD

(71) Applicant: ARIANEGROUP SAS, Les Mureaux (FR)

(72) Inventor: Ludovic Glavier, Les Mureaux (FR)

(73) Assignee: ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 19/105,167

(22) PCT Filed: Aug. 11, 2023

(86) PCT No.: PCT/FR2023/051263
§ 371 (c)(1),
(2) Date: Feb. 20, 2025

(87) PCT Pub. No.: WO2024/042287
PCT Pub. Date: Feb. 29, 2024

(65) Prior Publication Data
US 2025/0263180 A1     Aug. 21, 2025

(30) Foreign Application Priority Data
Aug. 23, 2022   (FR) ...................................... 2208462

(51) Int. Cl.
*B64G 1/64*     (2006.01)
(52) U.S. Cl.
CPC .................................. *B64G 1/6455* (2023.08)
(58) Field of Classification Search
CPC .... B64G 1/6455; B64G 1/2228; B64G 1/641; F16B 21/12; F16B 2200/63; F16B 31/00;
(Continued)

(56) References Cited

U.S. PATENT DOCUMENTS 5,248,233 A * 9/1993 Webster ................ F16B 5/0208
102/377
5,603,595 A * 2/1997 Nygren, Jr. ............ B64G 1/641
411/6
(Continued)

FOREIGN PATENT DOCUMENTS

CN        109080858 A      12/2018

OTHER PUBLICATIONS

Search Report and Written Opinion issued in International Application No. PCT/FR2023/051263, mailed Nov. 8, 2023.
(Continued)

*Primary Examiner* — Joshua D Huson
*Assistant Examiner* — Vicente Rodriguez
(74) *Attorney, Agent, or Firm* — Bookoff McAndrews, PLLC

(57) ABSTRACT

Device for separating a second part from a first part, including a first interface intended to be fixed to the first part and a second interface intended to be fixed to the second part, a docking stud passing through the first and second interfaces and being held at the first interface by a separation nut and at the second interface by a first nut/locknut assembly, the docking stud being covered by a cap secured to the second interface and intended to receive it once the separation nut has broken and the first and second interfaces have been separated, and a retraction spring is provided to extract the docking stud from the first interface, propel it towards a damping material fixed at the bottom of the cap and hold it there by its residual holding force alone.

10 Claims, 2 Drawing Sheets

(58) Field of Classification Search
CPC ...... F16B 37/0864; F16B 31/021; F16B 3/02;
F16B 31/022; F16B 31/005; F42B 3/006
USPC ................................... 411/2, 3, 5, 390, 391
See application file for complete search history.

(56) References Cited

U.S. PATENT DOCUMENTS

| | | | | |
|---|---|---|---|---|
| 6,939,073 | B1 * | 9/2005 | Ahmed | F16B 31/00 |
| | | | | 411/433 |
| 11,472,577 | B2 * | 10/2022 | Houghton | F16B 41/002 |
| 2011/0113605 | A1 * | 5/2011 | Plaza Baonza | B64G 1/6455 |
| | | | | 24/591.1 |
| 2016/0362199 | A1 * | 12/2016 | Best | B64G 1/14 |
| 2021/0094707 | A1 | 4/2021 | Houghton et al. | |

OTHER PUBLICATIONS

French Search Report in French Patent Application No. 2208462 dated Mar. 16, 2023 (9 pages).

* cited by examiner

[Fig. 1]
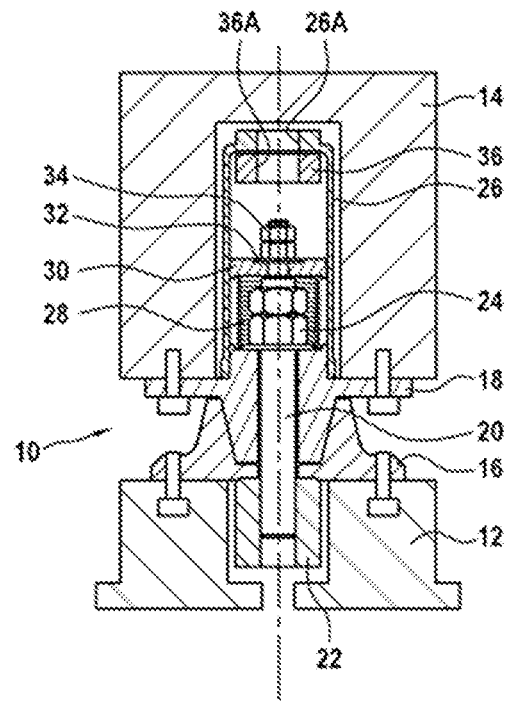
[Fig. 2]
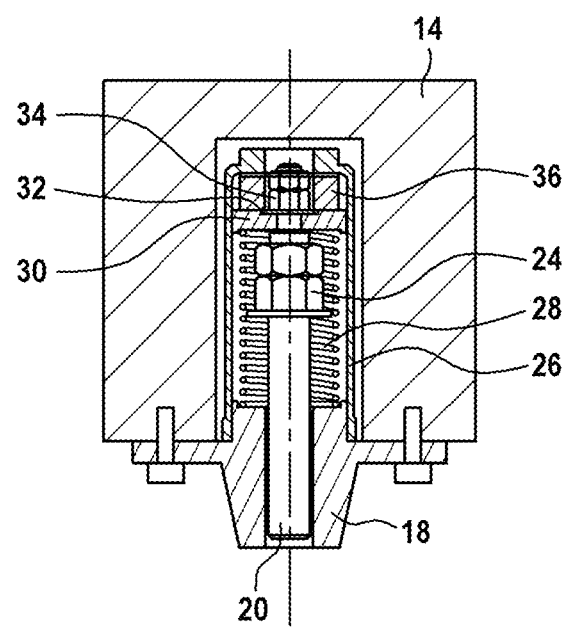

[Fig. 3]
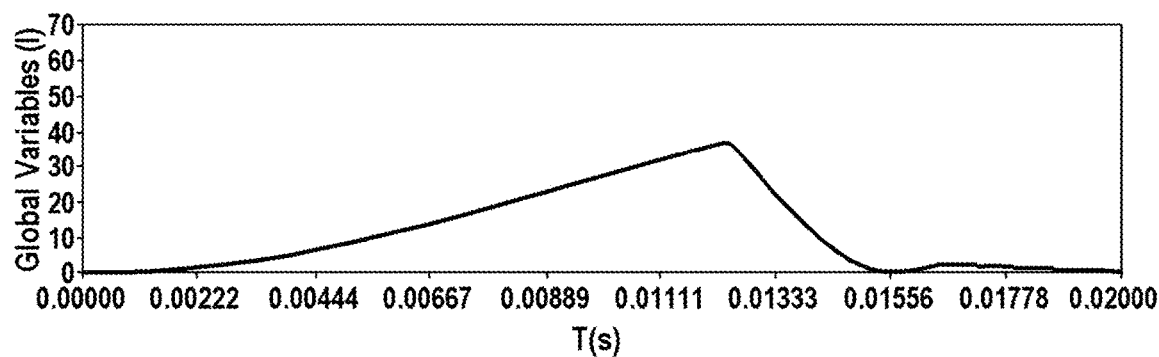
[Fig. 4]
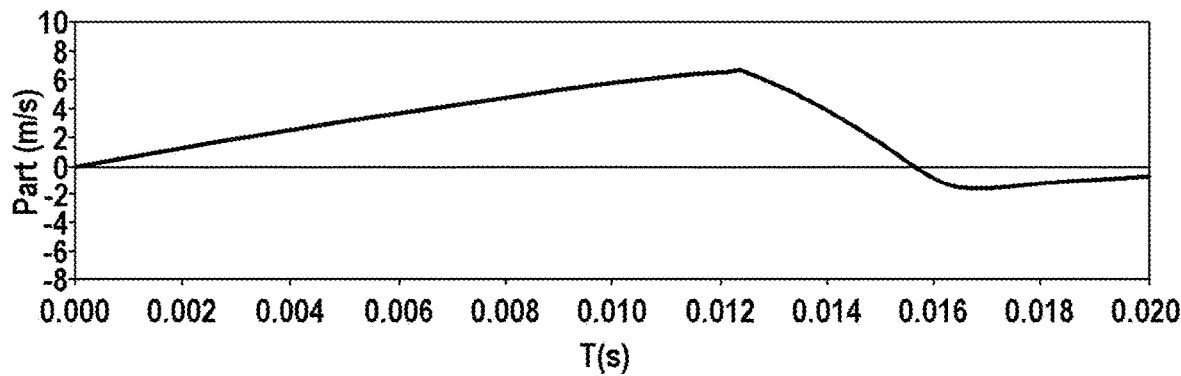

SEPARATION DEVICE WITH DAMPED LASHING STUD

CROSS-REFERENCE TO RELATED APPLICATIONS

This is a National Stage Application under 35 U.S.C. § 371 of International Application No. PCT/FR2023/051263, filed Aug. 11, 2023, now published as WO 2024/042287 A1, which claims priority to French Patent Application No. 2208462, filed Aug. 23, 2022, the entireties of which are incorporated herein by reference.

TECHNICAL FIELD

The present invention relates to separation systems between two parts or structural elements and more particularly to those equipped with docking studs whose pyrotechnic or non-pyrotechnic rupture of the separation nuts allows their retraction in one of the two parts.

PRIOR ART

In current separation systems, the shock resulting from the separation needs to be absorbed to prevent the stud from piercing the cap (bolt catcher) in which it is enclosed. A classic solution consists in providing a sort of notched cage in this cap to reduce the speed of the stud as it advances and preventing it from going back.

While such a solution is generally satisfactory, it proves unsuitable for satellite constellations which, to ensure point HRS (Hold down and Release System) connections that such constellations involve, require studs of large diameter (greater than 20 mm) and significant mass (greater than 1 kg) and above all must retract very quickly (in less than 20 ms), all performance criteria that are currently unattainable with the separation devices of the state of the art. U.S. Pat. Nos. 6,939,073, 5,603,595 and US 2021/094707 which disclose separation devices are also known.

DISCLOSURE OF THE INVENTION

The main purpose of the present invention is therefore to overcome the aforementioned performance criteria by proposing a device for separating a second part from a first part, including a first interface intended to be fixed to the first part and a second interface intended to be fixed to the second part, a docking stud passing through the first and second interfaces and being held at the first interface by a separation nut and at the second interface by a first nut/locknut assembly, the docking stud being covered with a cap secured to the second interface and intended to receive it once the separation nut has been broken and the first and second interfaces have been separated, characterized in that it includes a retraction spring for extracting the docking stud from the first interface, propelling it towards a damping material disposed at the bottom of the cap and holding it there by its residual holding force alone.

Thus, the docking stud is perfectly damped at the bottom of the cap and in a particularly short time and can remain there for the entire service life of the separate part.

Preferably, the retraction spring is pre-stressed between the second interface and a metal cover in abutment on a washer secured to the docking stud by a second nut/locknut assembly.

Advantageously, the spring is made of stainless steel and the metal cover is made of aluminum.

Preferably, the damping material is an elastoplastic or viscoelastic material.

Advantageously, the damping material is metal or polyurethane foam.

Preferably, the docking stud is made of Inconel and has a diameter greater than 20 mm.

Advantageously, the cap is secured to the second interface by screwing or bonding.

Preferably, the nut of the first nut/locknut assembly integrates a washer at its base.

Advantageously, each of the first and second interfaces can align 1 to 3 docking studs.

Preferably, the first part is a launcher and the second part is at least one satellite.

BRIEF DESCRIPTION OF THE DRAWINGS

Other characteristics and advantages of the present invention will emerge from the description given below, with reference to the appended drawings which illustrate one exemplary embodiment thereof without any limitation and in which:

FIG. 1 illustrates a separation device with a docking stud in accordance with the invention before separation, FIG. 2 shows a separation device with a docking stud in accordance with the invention after separation, FIG. 3 shows the variation of kinetic energy in the docking stud as a function of time, and FIG. 4 shows the variation of the speed of the docking stud as a function of time.

DESCRIPTION OF THE EMBODIMENTS

The principle of the invention is based on converting the kinetic energy into deformation energy and dissipating energy during the separation of a docking stud holding two parts together and on holding this docking stud in position once the separation has been performed.

FIG. 1 illustrates a block diagram of a separation device 10 in accordance with the invention before the separation of a second part from a first part. FIG. 2 illustrates this same device after the separation. The first part 12 is advantageously a launcher and the second part 14 is one or more satellites.

The separation device includes a first interface 16 intended to be fixed to the first part 12 and a second interface 18 intended to be fixed to the second part 14. A docking stud 20 passes through the first and second interfaces and is held at the first interface by a separation nut 22, preferably pyrotechnic nut, and at the second interface by a first nut/locknut assembly 24. The docking stud is covered with a cap 26 secured to the second interface 18, for example by screwing and/or bonding, and intended to receive this docking stud once the separation nut 22 has broken and therefore the first and second interfaces have been separated from each other. In practice and depending on the parts to be separated, the separation device may include one or more docking studs disposed in one or two lines. For example, three aligned docking studs are sufficient to hold a satellite with a diameter of one to two meters on its launcher.

According to the invention, a retraction spring 28 is mounted around the docking stud 20 between the second interface 18 on which its first end bears and a metal cover 30 into which its second end is inserted. The metal cover includes a central orifice to allow the passage of the docking stud on which is threaded a washer 32 secured to this docking stud by a second nut/locknut assembly 34 and constituting an abutment for the metal cover (the washer can also be directly integrated into the nut of this second assembly). The retraction spring can thus be pre-stressed to allow automatic extraction of the docking stud from the first interface 16 after breaking of the separation nut 22 and its propulsion towards a damping material 36 advantageously fixed by bonding on the bottom of the cover 26 and to hold it there.

As also shown in FIG. 2, the damping material and the cap bottom are pierced with an orifice 26A, 36A, to receive the second nut/locknut assembly 34 when the metal cover abuts on the damping material.

To facilitate the mounting of the first and second nut/locknut assemblies, the docking stud, preferably made of titanium, advantageously has a first diameter (typically greater than 20 mm, for example from 24 to 28 mm) on its part passing through the first and second interfaces and receiving the first nut/locknut assembly 24 and a second smaller diameter (typically from 12 to 14 mm) on its part beyond this first assembly, receiving the second nut/locknut assembly 34 and extending up to its terminal part. The second diameter can also be a tapped hole receiving an assembly screw.

The retraction spring is advantageously made of stainless steel and the metal cover of aluminum. The damping material can be an elastoplastic material, for example a metal foam (aluminum, copper alloys, etc.), or a viscoelastic material, for example a polyurethane foam.

The operation of the device of the invention is as follows. First, the satellite is separated by the release of the docking stud by the separation nut. Then, the retraction spring extracts the docking stud from the nut to house it in the cap (the bolt catcher). When the stud is in the bottom of the cap, a residual holding force in the retraction spring makes it possible to keep the stud in the cap during the life of the satellite. There is an impact creating a shock when the stud reaches the bottom of the cap, which is why a material making it possible to absorb this shock upon impact of the stud is placed in the bottom of the cap.

Tests were conducted as part of the separation of a satellite from a launcher with a docking stud of 1.42 kg and an impact speed of 6.62 m/s, i.e. an energy of 32 J to be absorbed.

The retraction spring has a stiffness of 12 N/mm with an empty length of 180 mm, and it is used in the interval from 90 mm (length before separation) to 50 mm (length after separation). The residual tension force for holding the docking stud after separation is of 600 N.

The damping material used is polyurethane foam. This material provides good shock absorption and therefore reaches very low shock levels. As an indication, an acceleration of 1,000 m/s$^2$ is obtained for a frequency of about 2,500 Hz. Generally, the critical shock threshold for not damaging adjacent systems is $N_{0.8f}=0.8*f*9.81$ in m/s$^2$, namely 19,620 m/s$^2$.

FIGS. 3 and 4 respectively show the variation of kinetic energy in the stud and that of the speed of the stud as a function of time. The energy and speed curves both tend towards zero, which demonstrates that the stud is indeed in a stable position and at zero speed in the bottom of the cap.

The invention claimed is:

1. A device for separating a second part from a first part, including a first interface fixed to the first part and a second interface fixed to the second part, a docking stud passing through the first and second interfaces and being held at the first interface by a separation nut and at the second interface by a first nut/locknut assembly, the docking stud being covered with a cap secured to the second interface and receive the docking stud once the separation nut has broken and the first and second interfaces have been separated, wherein the docking stud includes a retraction spring for extracting the docking stud from the first interface, propelling the docking stud towards a damping material fixed at a bottom of the cap and holding the docking stud at the bottom of the cap by a residual holding force alone of the retraction spring, the docking stud having a first diameter on a first portion of the docking stud passing through the first and second interfaces and receiving the first nut/locknut assembly and a second smaller diameter on a second portion of the docking stud beyond the first nut/locknut assembly, extending up to a terminal part of the docking stud, the second diameter receiving a second nut/locknut assembly or being a tapped hole receiving an assembly screw, wherein the damping material includes an orifice to receive the second nut/locknut assembly when the second diameter receives the second nut/locknut assembly.

2. The separation device according to claim 1, wherein the retraction spring is pre-stressed between the second interface and a metal cover in abutment on a washer secured to the docking stud by the second nut/locknut assembly.

3. The separation device according to claim 2, wherein the spring is made of stainless steel and the metal cover is made of aluminum.

4. The separation device according to claim 1, wherein the damping material is an elastoplastic or viscoelastic material.

5. The separation device according to claim 1, wherein the damping material is metal or polyurethane foam.

6. The separation device according to claim 1, wherein the docking stud is made of nickel-based superalloy and has a diameter greater than 20 mm.

7. The separation device according to claim 1, wherein the cap is secured to the second interface by screwing or bonding.

8. The separation device according to claim 1, wherein a nut of the first nut/locknut assembly integrates a washer at a base of the docking stud.

9. The separation device according to claim 1, wherein each of the first and second interfaces can align one to three docking studs.

10. The separation device according to claim 1, wherein the first part is a launcher and the second part is at least one satellite.

* * * * *